Figure 1:
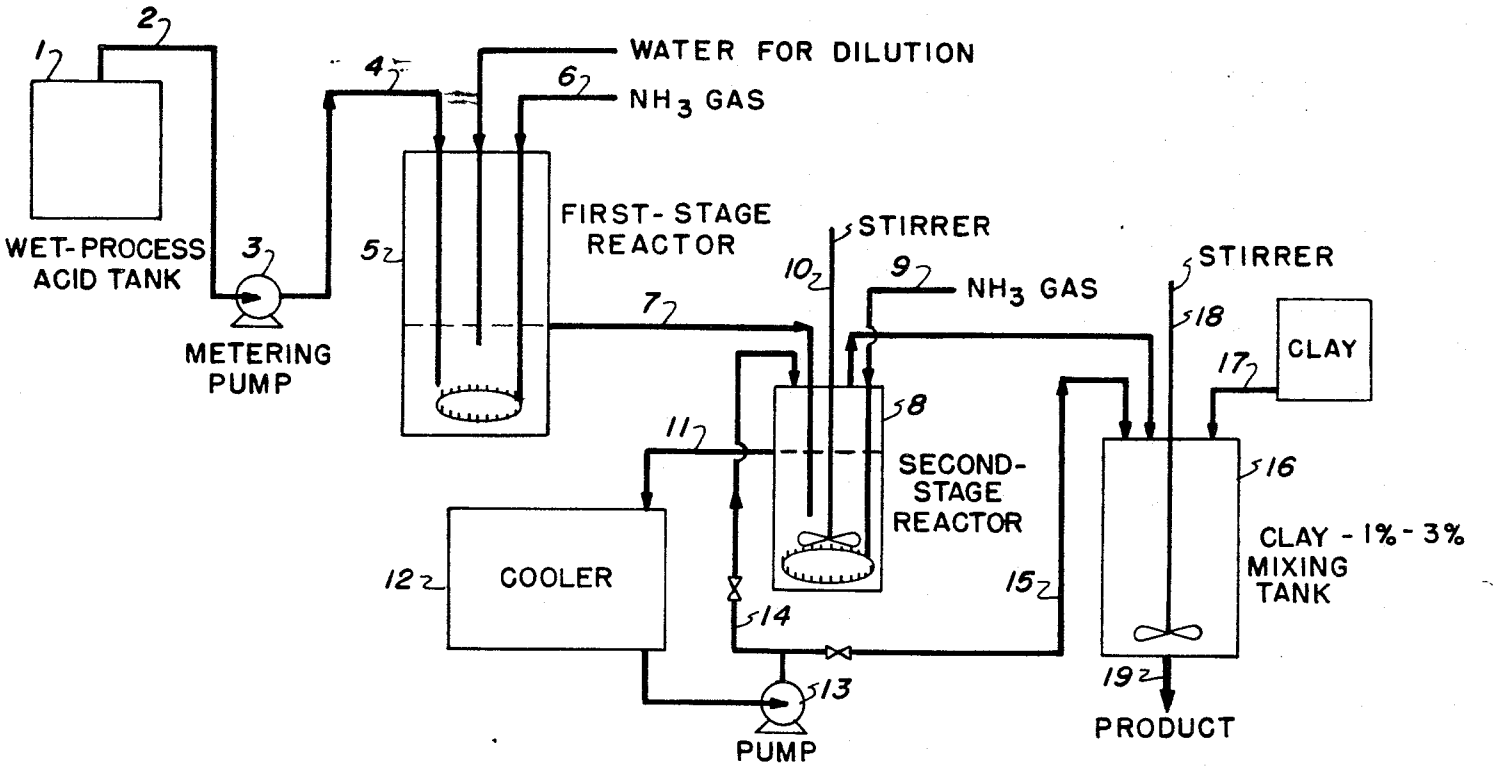
Figure 2:
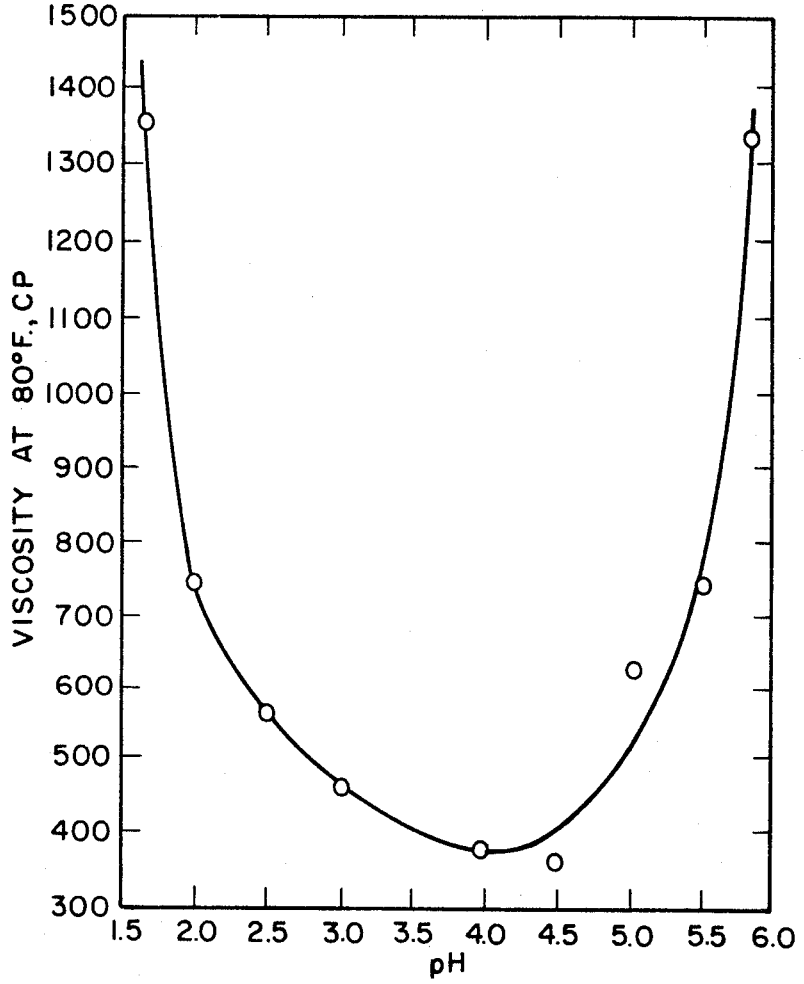
Figure 3:
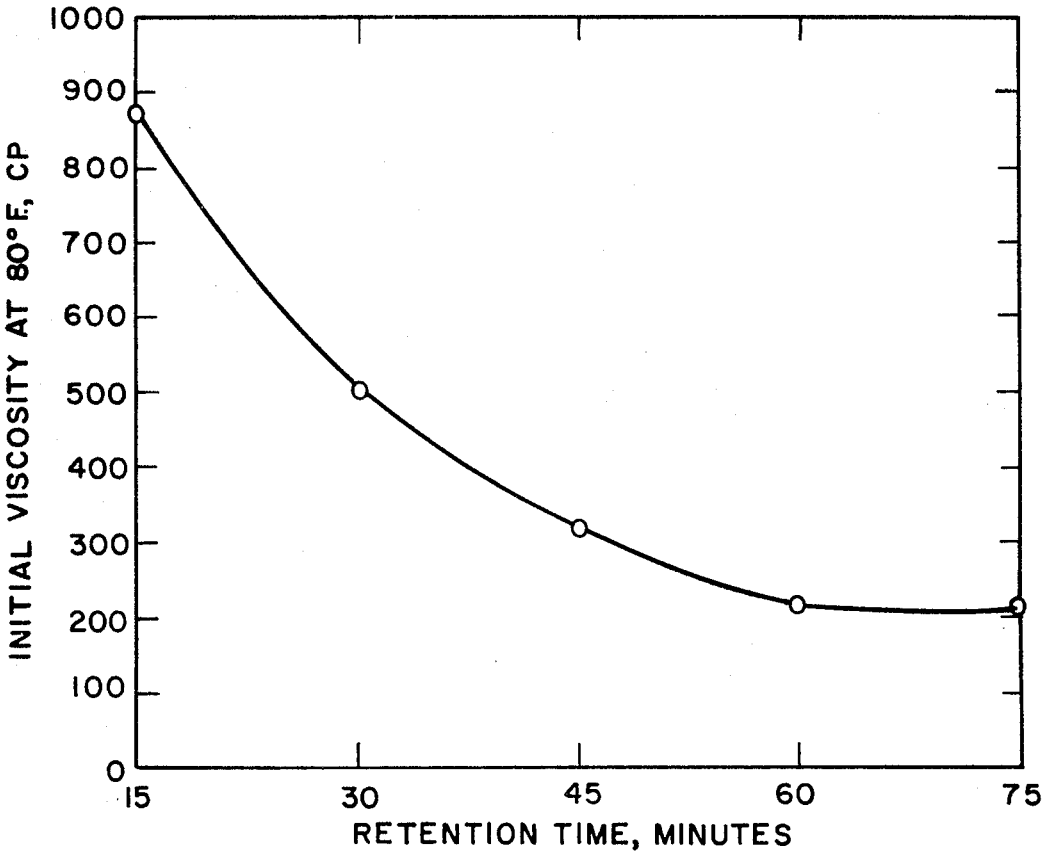

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED JULY 24, 1973

912 O.G. 1234

T912,015

PRODUCTION OF SUSPENSION FERTILIZERS FROM WET-PROCESS ORTHOPHOSPHORIC ACIDS

Lucian A. Kendrick, Jr., 919 Cumberland St., Florence, Ala. 35630

Filed Aug. 28, 1972, Ser. No. 284,155

Int. Cl. C05b *7/00*

U.S. Cl. 71—34

3 Sheets Drawing. 17 Pages Specification

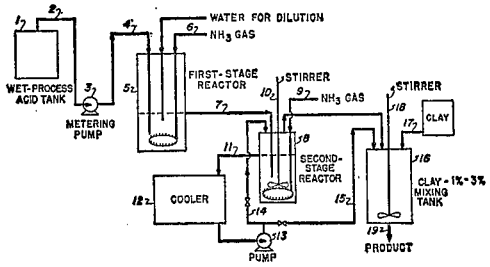

Gel-like precipitates identified as hydrated iron, aluminum, magnesium, and other metallic compounds occur in ammonium phosphate suspension fertilizers made from wet-process orthophosphoric acids. These small, hydrated, amorphous precipitates either destroy or decrease the fluidity of concentrated suspensions and they cannot be pumped, poured, or distributed to the soil. During storage, viscosity increases and the products frequently solidify. The dilution, during production, required for restoring fluidity decreases product grade and reduces the economic advantages gained from use of wet-process orthophosphoric acids.

A method of preventing formation of the amorphous, hydrated, gel-like materials that are derived from impurities in the acids has been found and satisfactory fluid high-grade suspensions can be economically produced. The new process involves ammoniating the acids in two or more stages. For best results, pH in the first stage should be in the range of 3.5 to 4.5; temperature, boiling; and time of retention, 30 to 60 minutes. Second stage retention time of 5 to 10 minutes is satisfactory and the temperature should be held to about 160° F. The suspension, pH about 5.9, may have a grade 12–40–0 or higher.

PRODUCTION OF AMMONIUM PHOSPHATE SUSPENSION FERTILIZERS BY A TWO-STAGE CONTINUOUS AMMONIATION PROCESS

EFFECT OF pH IN THE FIRST STAGE ON VISCOSITY OF 12-40-0 (1.0% CLAY) AFTER STORAGE FOR 30 DAYS AT 80°F.

EFFECT OF RETENTION TIME IN THE FIRST STAGE ON INITIAL VISCOSITY OF PRODUCT (12-40-0, 1% CLAY)